April 18, 1933.  O. EISENHUT  1,904,426
PRODUCTION OF ACETYLENE AND HYDROGEN
Filed Jan. 8, 1930
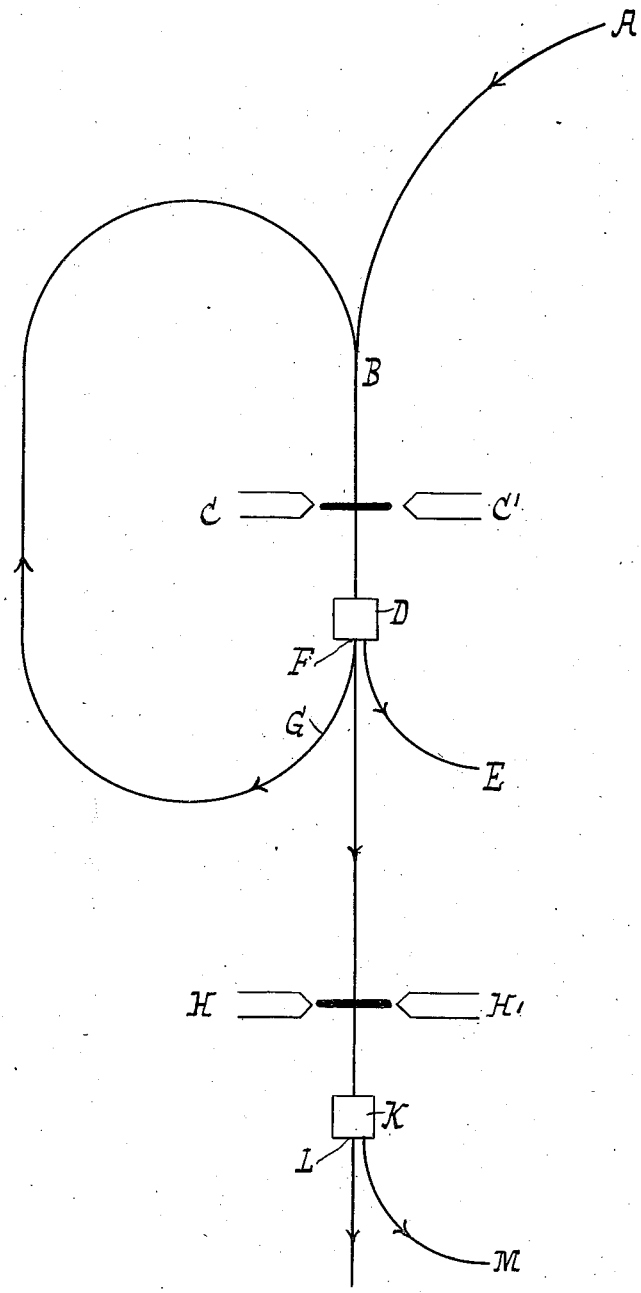
INVENTOR
Otto Eisenhut
BY
ATTORNEYS Patented Apr. 18, 1933

1,904,426

UNITED STATES PATENT OFFICE

OTTO EISENHUT, OF HEIDELBERG, GERMANY, ASSIGNOR TO I. G. FARBENINDUSTRIE AKTIENGESELLSCHAFT, OF FRANKFORT-ON-THE-MAIN, GERMANY

PRODUCTION OF ACETYLENE AND HYDROGEN

Application filed January 8, 1930, Serial No. 419,364, and in Germany January 12, 1929.

This invention relates to improvements in the manufacture and production of acetylene and hydrogen from hydrocarbons or gas mixtures containing the same.

I have found that in the continuous manufacture and production of acetylene and hydrogen from hydrocarbons, in particular gaseous or vaporous hydrocarbons, such as methane, or from gas mixtures containing hydrocarbons by treatment in the electric arc, special advantages are offered when the operation is carried out as described below. The initial gases may also, if desired, contain hydrogen, nitrogen, carbon monoxide or carbon dioxide, the latter three preferably only in small amounts.

The hydrocarbons or gas mixtures containing the same which are to be worked up into acetylene and hydrogen, after being mixed with a part of the residual gases from a previous working operation are first subjected to a treatment with one or more electric arcs. The acetylene formed is then wholly or partially separated by any known or suitable means. The said separation may, for example, be effected by scrubbing with solvents, in particular organic solvents, such as acetone or cyclohexanone, or by means of water under pressure, the said scrubbing being carried out, for example, by passing the gases through a shower or a bath of the liquid. The separation may also be effected by chemical means, for example with the aid of cuprous salts or other absorbents or by means of adsorbents, such as active charcoal, kieselguhr, silica gel or other active gels, or by means of cooling to very low temperatures, or with the application of pressure or both, or by any of the foregoing means in combination. The residual gas, which in some cases still contains large amounts of the initial hydrocarbons is in part led back into circulation after being mixed with fresh gas for treatment in the same arc or arcs and in part is subjected to a treatment in another electric arc or arc system which latter treatment may be the same as or different from the first treatment. The necessary length of the electric arcs for maximum efficiency may be obtained preferably in each case between a central electrode and a surrounding counter electrode, the central electrode being furnished by an insulating layer cast round the same up to its end and another insulating layer being movably arranged between the two electrodes. The electric arc furnaces may also have the form of the well-known Schönherr furnaces. In some cases it may be advantageous to repeat the stages hereinbefore described several times. It is also possible to add small amounts of hydrocarbons or other gases, for example nitrogen, hydrogen and the like to the residual gas, which has been branched off after the first treatment in the electric arc or arc system after the removal of the acetylene in order to be subjected to further treatment in the electric arc, the purpose of this addition being the adjustment of the composition of the gas. The said second treatment may also be carried out by circulating the gases through the arc or arc system. The process may be carried out under reduced, atmospheric or elevated pressure.

One method of carrying out the invention is illustrated in the accompanying diagram, though it should be understood that the invention is not limited thereto.

Fresh hydrocarbon gas is introduced by the pipe line A and is mixed with recycled gases which have already passed through the arc or arc system C, $C_1$ at B. The gas mixture is then passed through the said arc or arc system and then to the separator D where the acetylene formed is separated off and removed by the pipe line E. The gases which have been freed from acetylene issue from the separator at F. At G part of the said gases is branched off and recycled to the point B where it is intermixed with further fresh gases. The other part of the said gases branched off at G is passed through the arc or arc system H, $H_1$. If desired, the gases may then be passed on to a further separator K, hydrogen being drawn off at L and acetylene at M.

By working in this manner it is possible to obtain acetylene and hydrogen of industrial purity from hydrocarbons or mixtures containing the same with a comparatively small expenditure of energy and without undesirable by-reactions, since the production of the greater part of the acetylene may be carried out in the first treatment with an efficient employment of energy and since by the energy employed in the second treatment, in which the smaller concentration of methane is worked up into acetylene, large amounts of pure hydrogen are simultaneously obtained. The process according to the present invention also has the advantage that in some cases it may be carried out with only one adjustment of the composition of the gas mixture. The process may be carried out under any suitable pressure, but it is preferable to work at a pressure of about 25 atmospheres.

The folowing examples will further illustrate the nature of this invention, but the invention is not restricted to these examples. The parts are by volume.

Example 1

140 cubic meters of 92 per cent methane are added to about 370 cubic meters of a gas mixture containing 18.5 per cent of methane and 81.5 per cent of hydrogen, and the gas mixture is then passed in about an hour through an electric arc having a power of about 550 kilowatts. The gas mixture obtained contains for example 7.8 per cent of acetylene, 75.2 per cent of hydrogen and 17.0 per cent of methane. After separating the acetylene, for example by washing out by means of cyclohexanone, a gas mixture having the same composition as the gas mixture originally added to the methane, namely 18.5 per cent of methane and 81.5 per cent of hydrogen, remains behind. 370 cubic meters of this mixture with the addition of 140 cubic meters of fresh gas are returned to circulation as already described while the remainder is subjected to another treatment in an electric arc having a power of about 200 kilowatts. The gas mixture obtained by this latter treatment has the composition: 7.0 per cent of acetylene, 91.1 per cent of hydrogen and 1.9 per cent of methane. After separation of the acetylene it yields 200 cubic meters of hydrogen containing 2 per cent of methane. In all, 62 cubic meters of acetylene are obtained with an expenditure of nergy of 12.8 kilowatts per kilogram of acetylene without taking into account heat regeneration.

Example 2

122 cubic meters of methane are added to 400 cubic meters of a gas mixture containing 89 per cent of hydrogen and 11 per cent of methane and the whole of the gas is then sent in about an hour through an electric arc, having a power of about 550 kilowatts. The gas mixture obtained contains 7.6 per cent of acetylene, 82.2 per cent of hydrogen and 10.2 per cent of methane. After removing the acetylene and branching off 170 parts of the residual gas there remain 400 cubic meters of a gas having the composition: 89 per cent of hydrogen and 11 per cent of methane, which is again returned to circulation with the addition of 122 cubic meters of methane. The branched-off mixture of methane and hydrogen is subjected to another treatment in an electric arc having a power of about 200 kilowatts, after the addition of 17 cubic meters of methane. The gas mixture thus obtained has the composition: 7.0 per cent of acetylene, 91.1 per cent of hydrogen and 1.9 per cent of methane and after separation of the acetylene yields 200 cubic meters of hydrogen containing 2 per cent of methane. In all, 62 cubic meters of acetylene are obtained. The expenditure of energy amounts to 13.1 kilowatt hours per kilogram of acetylene.

Example 3

77 parts of 92 per cent methane are added to 175 parts of a gas mixture consisting of about 78.5 per cent of hydrogen and about 21.5 per cent of methane and the gas mixture thus obtained is passed under atmospheric pressure through an electric arc system. The gas mixture thus obtained consists of 8 per cent of acetylene, about 20 per cent of methane and about 72 per cent of hydrogen. After removal of the acetylene formed and branching off 100 parts of the remaining gas, 175 parts of a gas remain over, having the composition 78.5 per cent of hydrogen and 21.5 per cent of methane, which are again subjected to the said treatment after an addition of 77 parts of 92 per cent methane. A mixture of methane and hydrogen which has been branched off is subjected to a different treatment in an electric arc under a reduced pressure of 80 millimeters mercury gauge, a gas mixture containing 8.9 per cent of acetylene, about 91 per cent of hydrogen and less than 0.1 per cent of methane being thus obtained. After separating off the acetylene, 105 parts, measured at ordinary pressure, of an extremely pure hydrogen are obtained containing less than 0.1 per cent of methane. 35.1 parts of acetylene are obtained in all with an expenditure of energy of 12.2 kilowatt hours per kilogram of acetylene.

What I claim is:

1. A process for the production of acetylene and hydrogen from gases comprising hydrocarbons in which a substantially complete conversion of said hydrocarbons into hydrogen and acetylene is effected, which comprises passing the said gases through a system of electric arcs, branching off at least at one spot within the said system a part of the gases, which have been subjected to the treatment of at least one electric arc wherein only a partial conversion to acetylene and hydrogen was effected, mixing the branched-off portion with the gases which have not yet passed at least the last of the arcs with which the said part has been treated, and subjecting the other part of the said gases to a further electric arc treatment to effect a substantially complete conversion of the hydrocarbons contained therein into acetylene and hydrogen.

2. A process for the production of acetylene and hydrogen from gases comprising hydrocarbons in which a substantially complete conversion of said hydrocarbons into hydrogen and acetylene is effected, which comprises passing the said gases through a system of electric arcs, branching off at least at one spot within the said system a part of the gases, which have been subjected to the treatment of at least one electric arc wherein only a partial conversion to acetylene and hydrogen was effected and which portion has then at least partly been freed from the acetylene formed, mixing the branched-off portion with the gases which have not yet passed at least the last of the arcs with which the said part has been treated and subjecting the other part of the said gases to a further electric arc treatment to effect a substantialy complete conversion of the hydrocarbons contained therein into acetylene and hydrogen.

3. A process for the production of acetylene and hydrogen from gases comprising hydrocarbons in which a substantially complete conversion of said hydrocarbons into hydrogen and acetylene is effected, which comprises passing the said gases through a system of electric arcs, branching off at least at one spot within the said system a part of the gases, which have been subjected to the treatment of at least one electric arc wherein only a partial conversion to acetylene and hydrogen was effected, and have then at least partly been freed from the acetylene formed by treatment with a liquid dissolving acetylene, mixing the branched-off portion with the gases which have not yet passed at least the last of the arcs with which the said part has been treated, and subjecting the other part of the said gases to a further electric arc treatment to effect a substantially complete conversion of the hydrocarbons contained therein into acetylene and hydrogen.

4. A process for the production of acetylene and hydrogen from gases comprising hydrocarbons in which a substantially complete conversion of said hydrocarbons into hydrogen and acetylene is effected, which comprises passing the said gases through a system of electric arcs, branching off at least at one spot within the said system a part of the gases which have been subjected to the treatment of at least one electric arc wherein only a partial conversion to acetylene and hydrogen was effected and have then at least partly been freed from the acetylene formed by treatment with organic liquids dissolving acetylene, mixing the branched-off portion with the gases which have not yet passed at least the last of the arcs with which the said part has been treated, and subjecting the other part of the said gases to a further electric arc treatment to effect a substantially complete conversion of the hydrocarbons contained therein into acetylene and hydrogen.

5. A process for the production of acetylene and hydrogen from gases comprising hydrocarbons in which a substantially complete conversion of said hydrocarbons into hydrogen and acetylene is effected, which comprises passing the said gases under an elevated pressure through a system of electric arcs, branching off at least at one spot within the said system a part of the gases which have been subjected to the treatment of at least one electric arc wherein only a partial conversion to acetylene and hydrogen was effected, and have then at least partly been freed from the acetylene formed, mixing the branched-off portion with the gases which have not yet passed at least the last of the arcs with which the said part has been treated, and subjecting the other part of the said gases to a further electric arc treatment to effect a substantially complete conversion of the hydrocarbons contained therein into acetylene and hydrogen.

6. A process for the production of acetylene and hydrogen from gases comprising hydrocarbons, which comprises passing the said gases through a system of electric arcs, branching off at least at one spot within the said system a part of the gases which have been subjected to the treatment of at least one electric arc and have then at least partly been freed from the acetylene formed, mixing the branched-off portion with the gases which have not yet passed at least the last of the arcs with which the said part has been treated, adding to the other part of the said gases a gaseous hydrocarbon, and subjecting it to a further electric arc treatment.

7. A process for forming acetylene and hydrogen from an initial gas mixture containing saturated hydrocarbons which comprises passing the gas mixture through an electric arc, separating the acetylene formed from the resulting gas mixture, branching off a part of said last named mixture and reintroducing the same together with a quantity of the initial mixture into said arc, and passing the residue of the mixture from the treatment in said first arc through an arc of less intensity than said first arc.

8. A process as defined in claim 7 wherein the intensity of the first arc is of about 550 kw. and that of the second arc 200 kw.

In testimony whereof I have hereunto set my hand.

OTTO EISENHUT.